March 7, 1950     C. O. SOHLBERG     2,499,533
SPEED REGULATOR, ESPECIALLY FOR DIALS
Filed May 16, 1946
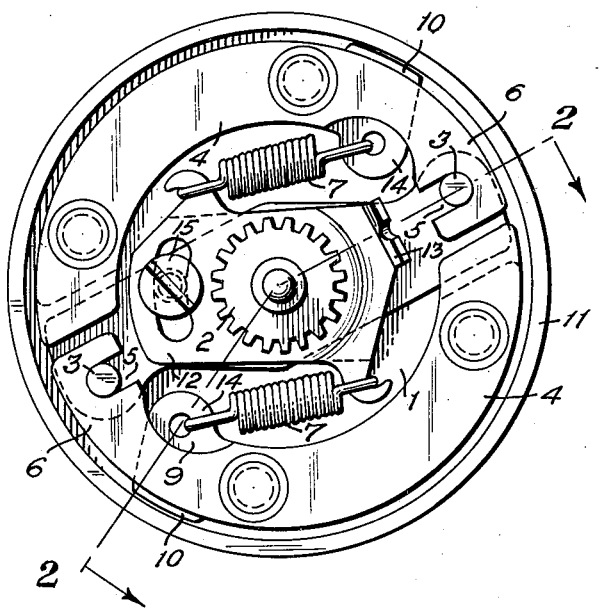
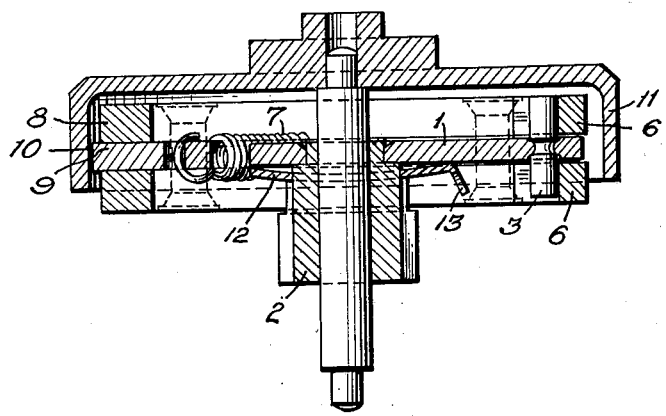
INVENTOR.
Carl Oscar Sohlberg
BY
Attorneys.

Patented Mar. 7, 1950

2,499,533

UNITED STATES PATENT OFFICE 2,499,533

SPEED REGULATOR, ESPECIALLY FOR DIALS

Carl Oscar Sohlberg, Stockholm, Sweden, assignor to Telefonaktiebolaget L M Ericsson, Stockholm, Sweden, a company of Sweden Application May 16, 1946, Serial No. 670,270
In Sweden June 7, 1945

2 Claims. (Cl. 188—180)

The present invention relates to a speed regulator, especially for dials used within the range of automatic telephony. The object of the invention is to produce a simple and reliable construction. According to the invention, this is achieved chiefly by the brake weight of the regulator having a branch provided with an open groove, in which the brake weight is turningly mounted on a pin.

The invention will be explained more clearly with reference to the accompanying drawing, in which Fig. 1 shows an enlarged top plan view of the regulator, and Fig. 2 is a transverse section of the regulator along the line 2—2 in Fig. 1.

A cog wheel 2 and two shaft pins 3 are riveted on the frame 1 of the regulator. On each one of said pins a brake weight 4 is turningly mounted in its branch 6 provided with an open groove 5. The brake weights 4 are kept in their positions by coil springs 7 fastened by a spring tightener 12. On rotation of the regulator, the coil springs are also arranged to counteract the centrifugal force in a way known per se. In the shown embodiment, the brake weight 4 is composed of two parts, which are riveted on each side of a sheet 9, which, in its outer end, is provided with a brake shoulder 10. On rotation of the regulator, said shoulder will glide against a brake sleeve 11. The sheet 9 has, on its inner side, a loop 14, in which the spring 7 is hung. Naturally a brake weight 4 with pertaining sheet 9 may be made in one piece. The spring tightener 12, which is made of resilient iron, is turningly mounted round the cog wheel 2 in front of a lug 13 and prebent in such a way as to press against the frame 1 with such a pressure, that a torque somewhat greater than the torque produced by the tension in the coil spring is necessary in order to turn the spring tightener, i. e. to neutralize the friction. The spring tightener 12 can be locked in the desired position by means of a screw 15.

I claim:

1. In a speed regulator for dials, the combination of a rotatable frame provided with an upstanding pin; a brake weight provided with a slot in which said pin is received to pivot said weight on said frame for oscillation by centrifugal force when said frame is rotated; and a coil spring having one end attached to said frame and its other end attached to said weight in such relation to said slot as to secure said weight on said pin and bias said weight against said force.

2. In a speed regulator for dials, the combination of a rotatable frame provided with a pair of upstanding pins disposed at diametrically opposed ends of said frame; a pair of brake weights, each provided with a slot in which one of said pins is received to pivot said weights on said frame for oscillation by centrifugal force when said frame is rotated; and a pair of coil springs, each having one end attached to said frame and its other end attached to one of said weights in such relation to its slot as to secure said weight on its pin and bias said weights against said force.

CARL OSCAR SOHLBERG.

REFERENCES CITED

The following references are of record in the file of this patent:

UNITED STATES PATENTS

| Number | Name | Date |
|---|---|---|
| 630,363 | Ireland | May 3, 1898 |
| 1,616,142 | Rotter | Feb. 1, 1927 |
| 1,749,004 | Strawn | Mar. 4, 1930 |